F. R. BOYNTON.
WIND SHIELD.
APPLICATION FILED APR. 2, 1917.
1,251,332.
Patented Dec. 25, 1917.
3 SHEETS—SHEET 1.
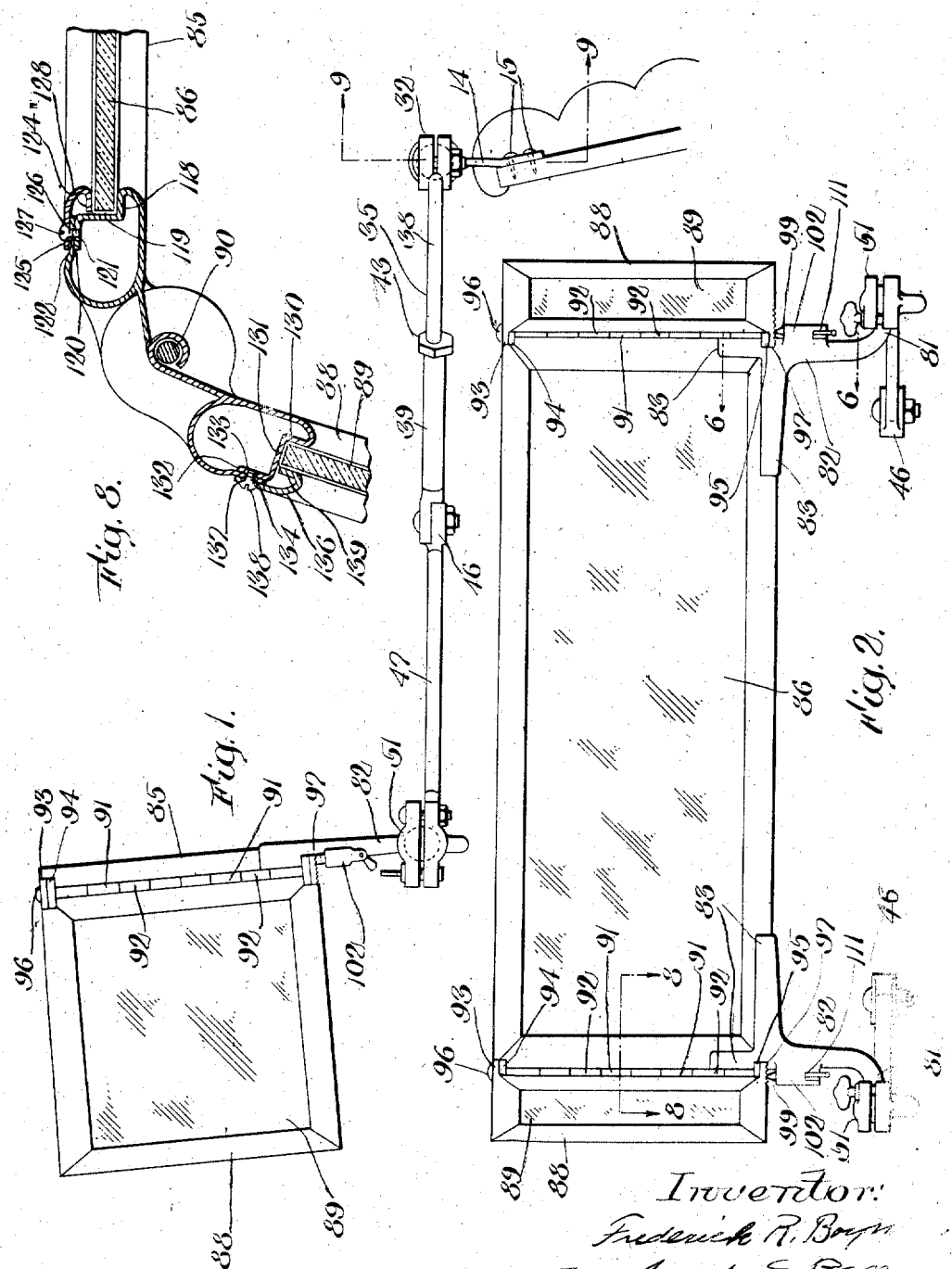
Inventor:
Frederick R. Boynton
by Horatio E. Bell
Attorney

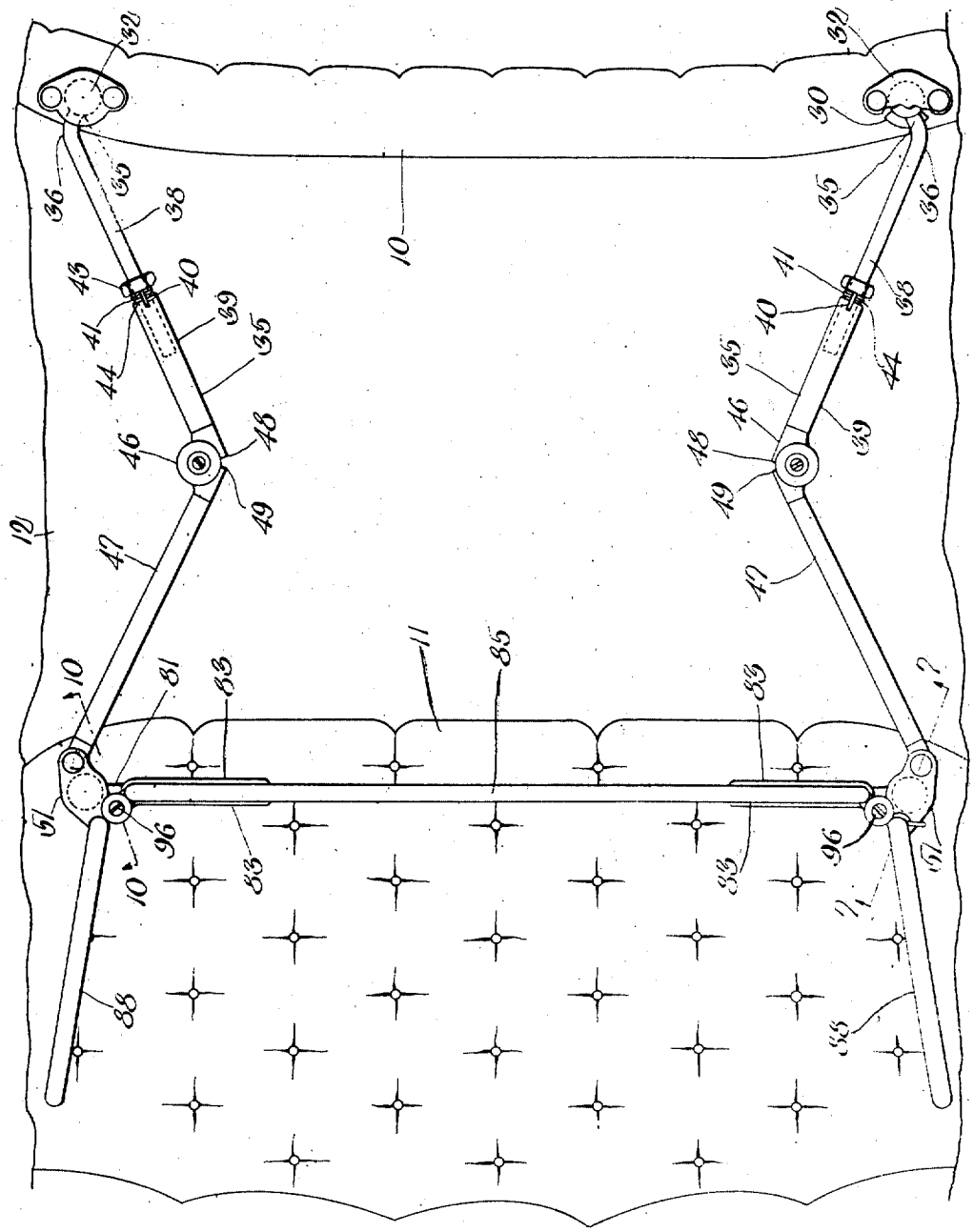

F. R. BOYNTON.
WIND SHIELD.
APPLICATION FILED APR. 2, 1917.
1,251,332.
Patented Dec. 25, 1917.
3 SHEETS—SHEET 3.
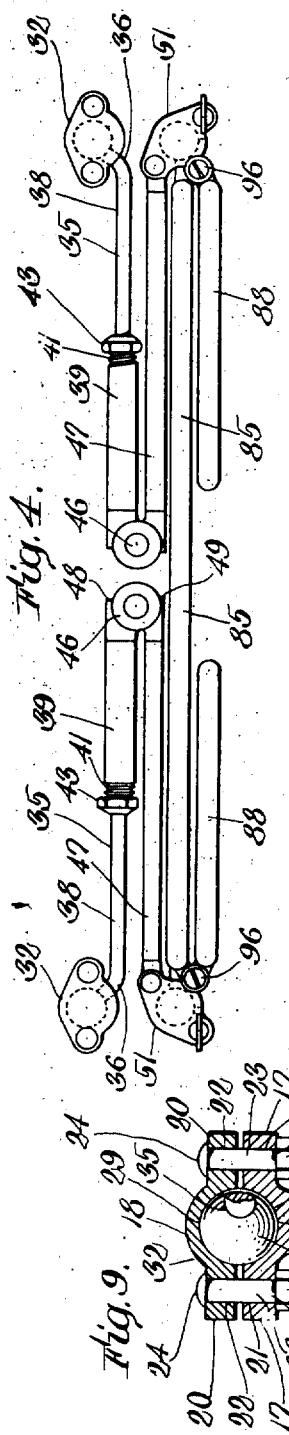
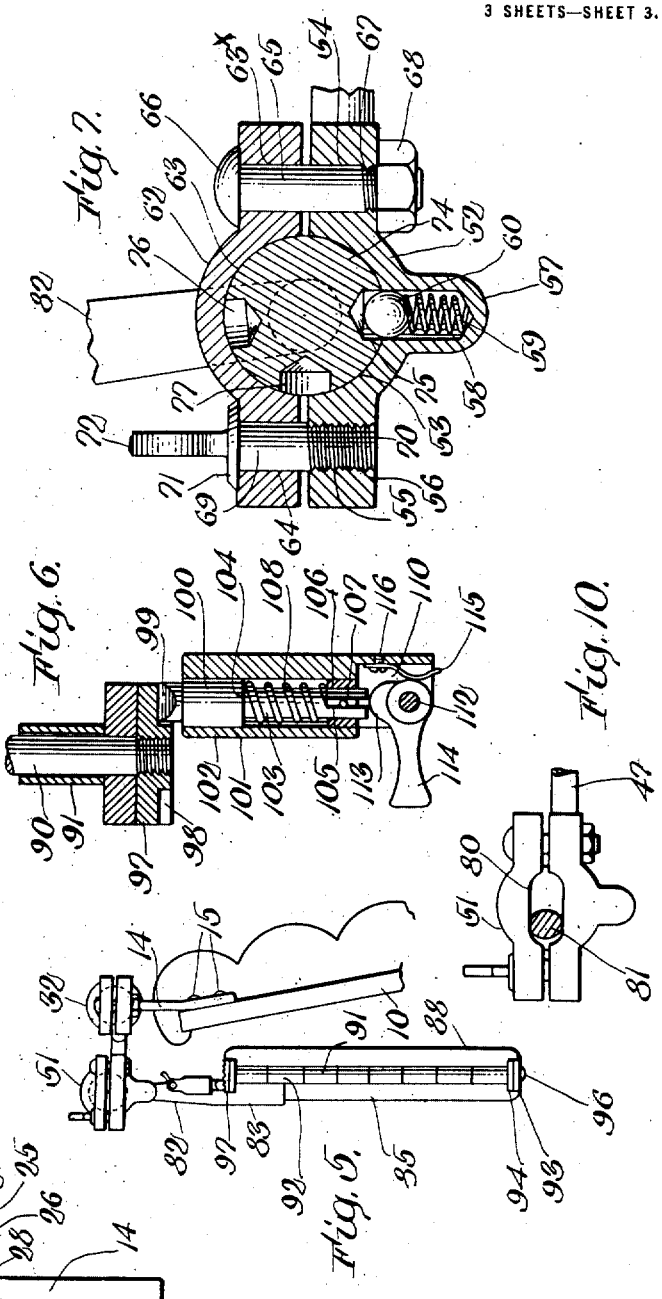
Inventor:
Frederick R. Boynton
by Horatio E. Bellows
Attorney.

UNITED STATES PATENT OFFICE.

FREDERICK R. BOYNTON, OF BROOKLYN, NEW YORK, ASSIGNOR OF ONE-THIRD PHILIP ALLEN, OF PROVIDENCE, RHODE ISLAND.

WIND-SHIELD.

1,251,332.   Specification of Letters Patent.   Patented Dec. 25, 1917.

Original application filed June 24, 1916, Serial No. 105,735. Divided and this application filed April 2, 1917. Serial No. 159,081.

*To all whom it may concern:*

Be it known that I, FREDERICK R. BOYNTON, a citizen of the United States, residing in the borough of Brooklyn, city of New York, in the county of Kings and State of New York, have invented certain new and useful Improvements in Wind-Shields, of which the following is a specification.

My invention relates to wind shields for automobiles and other vehicles, and this application is a division of my pending application Serial No. 105,735, filed June 24, 1916.

The essential objects of my invention is to provide in a foldable type of wind shield means for the facile removal or substitution of glass plates, to insure such lightness of weight in the frame and parts inclosing the glass plate as will not strain the pivoted and distended arms and joints required to support the frame and afford universal movement thereof when distended; and to attain these ends in a structure which is secure, and operable in a manner which will not require the removal of the glass supporting frame from the supporting arms which would involve excessive expense or entire dismantling of the pivoted supporting structure.

To these ends the invention consists of a device possessing certain claimed features of construction and relative arrangement of parts, one form of said device being illustrated in the accompanying drawings which form a part of this specification, and wherein like characters of reference indicate like parts throughout the views.

Figures 1, 2, and 3, show a side elevation, a rear elevation, and a plan of my device respectively partially distended, Figs. 4 and 5, plan and side elevations respectively of the parts in folded position, Figs. 6, 7, 8, and 9, sectional details on lines 6—6 of Fig. 2, 7—7 of Fig. 3, 8—8 of Fig. 2, and 9—9 of Fig. 1 respectively, and Fig. 10, a view of a socket on line 10—10 of Fig. 3.

In the construction illustrated, 10 and 11 represent the front and rear seats of an automobile or other vehicle 12. Attaching plates or posts 14 are fixed by screws 15 or otherwise to the upper end portions of the front seat. The upper end of each post, as shown in Fig. 9, has a cup or plate 16 provided with lateral ears 17. A cap or retaining plate 18 has similar ears 20, and both plates are normally slightly spaced from each other. In openings 21 and 22 in the respective ears are bolts 23 with heads 24, and with threads 25 for nuts 26 whereby the plates are relatively adjustable. The plates 16 and 18 have corresponding hemispherical cavities or seats 28 and 29 which coöperate to form a socket, and each has a cut away edge to form a horizontally disposed arcuate slot 30, as indicated in Fig. 3. Each of the two described socket members, indicated in a general way by the reference numerals 32, has in its spherical seat a ball 33 rotatable in the socket and frictionally engaging its seat to such an extent as may be desired by virtue of the screw adjustment of the retaining or clamping plate 18. Integral with the ball is an arm 35 provided preferably with an outward bend 36 adjacent the socket and movable in the slot 30. The arm 35 in the present instance comprises two parts 38 and 39, the former being solid and extending into the latter which is tubular. These relatively slidable telescoping parts are clamped in any desired relative position by virtue of longitudinal slots 40 in the end of the part 39, which slotted portion has threads 41 to receive a nut 43, which when turned clamps the segments 44, formed by the slots, into engagement with the part 38. Each arm 35 is connected at its outer end by a vertical pivot pin 46 with a second arm 47. The adjacent portions of the respective arms being flat and in a horizontal plane, and provided with butts 48 and 49 to prevent an excessive lateral distention of the arms.

Integral with or fixed to the outer end of each arm 47 is a socket member represented in a general way by the reference numeral 51, and shown in detail in Fig. 7. This comprises a base plate or cup 52 provided with a hemispherical seat or cavity 53. At opposite sides of the cavity the plate has an opening 54 and 55, the latter being provided with a thread 56. A downward extension 57 on the center of the plate has a vertical recess 58 in which is seated a spring 59 whose upper end supports a ball 60 partially inclosed by the recess and normally extending into the seat 53. Above the plate 52 is a retaining plate 62 with a curved or hemispherical cavity 63 registering with the cavity 53. The latter plate has holes 63ˣ and 64 in alinement with the holes 54 and 55 respectively. A bolt 65 in the openings 54 and 63ˣ has a head 66 on the retaining plate, and a thread 67 on its lower end. A nut 68 engages this thread and bears against the lower face of the plate 52. A clamping screw 69 in the hole 64 has a thread 70 on its lower portion engaging the thread 56 in the hole 55. A flange 71 on this screw rests upon the top of the retaining plate, and the screw terminates in a thumb piece 72.

In each socket member is a ball 74 seated in the cavities 53 and 63 and of such diameter as to space the plate 62 some distance from the plate 52. The degree of frictional engagement of the ball in its socket is controlled by turning the screw 69. The ball 74 has peripheral cavities 75 and 76 diametrically opposite each other, and a peripheral cavity 77 midway the other two cavities, said cavities 75 and 76 being in alinement with the cavity 58. Hence the rotation of the ball 74 brings the locking ball or member 60 successively into the cavities 75, 77 and 76, so that the ball 74 is temporarily locked in one of the three positions.

Through an arcuate opening 80 in each socket 51 extends an arm 81 integral with the ball 74, and having a vertical portion 82 carrying straps 83 brazed or otherwise attached to the lower ends of the frame 85 of the wind shield 86. To each end of the central shield frame 85 is pivoted the frame 88 of a smaller wind shield 89. The pivotal connection comprises a rod or pintle 90 loose in hinge sleeves 91 on the frame 85, and in hinge sleeves 92 on the frame 88. This rod is journaled in ears 93 and 94 on the upper ends of the frame 85 and 88 respectively, and in an ear 95 on the lower end of the frame 85. The upper end of the rod has a head 96 resting on the ear 93. Fast to or integral with the lower end of each frame 88 is a disk 97 having radial face teeth or serrations 98 upon its lower face adapted to receive the flat point 99 upon the upper end of a vertical pin 100 slidably mounted in a bore 101 in a cylindrical lateral lug 102 upon the arm 82. Each pin has a shank 103 of reduced diameter forming an intermediate shoulder 104, and has a vertical slot 105 in its lower end, which end projects slightly below the lug 102. A guide ring 106 fast to or integral with the lug is located in the bottom of the bore. A transverse guide pin 107 in the ring 106 passes loosely through the slot 105 and prevents rotation of the point 99. A helical spring 108 surrounding the shank 103 rests upon the ring 106 and presses against the shoulder 104 normally keeping the point 99 in yielding engagement with the teeth 98 whereby the frame 88 may be manually turned to any desired angle relatively to the frame 85. Below the bore 101 the lug 102 has an enlarged recess 110 communicating with a vertical slot 111 in the wall of the lug, in which recess is a transverse pivot pin 112 upon which is mounted a cam 113 adapted to engage the lower end of the pin 100 and having a lever or handle 114 extending through the slot 111. A flat spring 115 fixed to the lug by a screw 116 engages the cam and retains it in adjusted position. When the cam is in the position shown the pin point 99 is locked in whatever position upon the disk 97 is desired. When the handle 114 is downwardly pressed the cam disengages the pin 100, and the frame 88 may again be manually moved to any angle.

In originally mounting the described parts upon a vehicle the telescoping sections 38 and 39 are adjusted to the necessary relative positions and clamped in such positions by the nuts 43, so that the length of the arm 35 may be accommodated to a seat of any width. After the members 33 are attached to the seat the balls 33 are sufficiently clamped in their sockets by manipulating the nuts 26 on the bolts 23, it being desirable that the balls be frictionally engaged but still easily movable. The bends 36 in the arms 35 in conjunction with the arcuate slots 30 are found to assist maintain the parts in a horizontal plane, although these bends are not imperative. From the folded position shown in Fig. 4 the supporting arms 35 and 47 may be distended until they are in alinement with each other, or to any relative angle, such as that shown in Fig. 3. The relative extension of the arms obviously determines the distance of the shield forwardly or rearwardly of the seats. To fold the parts after distention, the wing frames 88 are released by depressing the levers 114, and are closed against the central frame 85, whereupon the levers 114 are returned to locked position. Next the screws 69 are loosened to unclamp the balls 74 and permit the folded frames to drop by gravity into a vertical position, as shown in Fig. 5, in which position the balls are reclamped by the screw 69. The frames are then manually pushed forward to a position adjacent the folder arms 35 and 47 and the parts are thus compactly positioned as shown in Fig. 4.

For the purpose of substituting new panes of glass 86 and 89 in the frames 85 and 88 respectively these frames are constructed in detail as follows. The frame 85 is bent up from sheet metal having upon its inner face a peripheral shoulder 118, as shown in Fig. 8. At the base of the shoulder the material extends transversely of the frame as at 119, and is then bent rearwardly forming a peripheral flange 120 in which are threaded perforations 121 registering with similar perforations 122 in the adjacent wall of the frame against which said flange abuts. A removable peripheral member 124 has a body 125 provided with threaded perforations 126 registering with the perforations already referred to, and in all these perforations are screws 127. The body 125 is bent to form a peripheral shoulder 128, opposite the shoulder 118. Thus the rectangular peripheral member 125 is removable by virtue of the screws 127.

The frames 86 are constructed in a similar manner, being hollow, and comprising the fixed shoulder 130, transverse seat 131, inturned flange 132 with perforations 133 registering with wall perforations 134. 136 is the removable member having perforations 137 to receive the screws 138, and having a shoulder 139 to correspond with shoulder 130, between which shoulders is seated the pane 89.

It will be observed that the hollow character of the frame and of the removable rim insures a maximum of lightness to this construction, and the material thereof facilitates the formation of the parts of the frame of thin metal whereby it is possible to form the flange and shoulders and effect this end in a cheap manner. The thinness of the material imparts a certain resiliency to the frame and rim when constructed as described and makes a very effective engagement with the pane possible. It will be further noted that the described construction of frame and retaining rim not only prevents excessive weight at the extremity of the sustaining arms which is of extreme importance in this structure, but also that any broken pane may be removed or a new one substituted without demounting any part of the pivoted frame.

I claim:—

In a device of the type set forth, a hollow frame formed from sheet metal bent to form a peripheral shoulder upon its inner face, a transverse extension at the base of said shoulder and a rearwardly extending peripheral flange, the body portion of said frame being bent to form a flange engageable with the first-named flange, and a removable peripheral member bearing against the last-named flange and bent to form a peripheral shoulder opposite the first-named shoulder, and means passed through said peripheral member and said flanges for removably securing the parts in position.

In testimony whereof I have affixed my signature.

FREDERICK R. BOYNTON.